United States Patent [19]
Masuda

[11] Patent Number: 5,239,159
[45] Date of Patent: Aug. 24, 1993

[54] NOZZLE MOVEMENT SYSTEM FOR LASER MACHINING EQUIPMENT

[75] Inventor: Teruo Masuda, Minamitsuru, Japan

[73] Assignee: Fanuc Ltd., Minamitsuru, Japan

[21] Appl. No.: 820,683

[22] PCT Filed: May 31, 1990

[86] PCT No.: PCT/JP91/00644

§ 371 Date: Jan. 24, 1992

§ 102(e) Date: Jan. 24, 1992

[87] PCT Pub. No.: WO91/18706

PCT Pub. Date: Dec. 12, 1991

[30] Foreign Application Priority Data

May 31, 1990 [JP] Japan .................. 2-141946

[51] Int. Cl.⁵ .................................. B23K 26/08
[52] U.S. Cl. ...................... 219/121.78; 364/474.08
[58] Field of Search ............. 364/474.08; 219/121.67, 219/121.72, 121.78, 121.79

[56] References Cited

U.S. PATENT DOCUMENTS 5,067,086 11/1991 Yamazaki et al. ............. 364/474.08

Primary Examiner—C. L. Albritton
Attorney, Agent, or Firm—Staas & Halsey

[57] ABSTRACT

Disclosed is a nozzle movement system for a laser machining equipment for moving the nozzle of a CNC laser machining equipment when carrying out a three-dimensional machining of a machining surface of a workpiece. A hand coordinate system composed of the axial direction of the nozzle and the plane perpendicular to the axis of the nozzle is provided, and a movement command on the hand coordinate system is output by using a machine operation panel (31). A matrix creation means (38) creates a conversion matrix from the hand coordinate system to a basic coordinate system, based on the rotational position data stored in registers (39a, 39b) of an $\alpha$-axis and $\beta$-axis exhibiting the attitude of the nozzle. A coordinate conversion means (37) converts movement commands ($\Delta xh$, $\Delta yh$ and $\Delta zh$) on the hand coordinate system to amounts of movement ($\Delta x$, $\Delta y$ and $\Delta z$) on the basic coordinate system, by using the conversion matrix, and moves the nozzle. With this arrangement, the nozzle can be simply moved without changing the distance between the nozzle and the machining surface of a workpiece. Further, the distance between the nozzle and the workpiece can be adjusted by moving the nozzle perpendicularly with respect to the machining surface.

5 Claims, 5 Drawing Sheets

NOZZLE MOVEMENT SYSTEM FOR LASER MACHINING EQUIPMENT

DESCRIPTION

1. Technical Field

The present invention relates to a nozzle movement system for a laser machining equipment, by which the nozzle of a CNC laser machining equipment for carrying out a three-dimensional machining is moved with respect to a machining surface, and more specifically, to a nozzle movement surface for a laser machining equipment by which a nozzle can be easily moved along the plane surface of a workpiece.

2. Background Art

A NCN laser machining equipment composed of a combination of a laser oscillator and a numerical control apparatus (CNC) is widely used. In particular, a machining of a complex configuration can be carried out at a high speed by a non-contact system, due to a combination of the characteristics of the laser machining equipment by which a machining can be carried out at a high speed and the characteristics of the numerical control apparatus (CNC) by which a complex contour can be controlled. Particularly, a CNC laser machining equipment capable of carrying out a three-dimensional machining which cannot be carried out by a conventional punch press, nibbling machine and the like is put to practical use.

To carry out a three-dimensional machining by the CNC laser machining equipment, the attitude of the nozzle at an extreme end must be controlled, in addition to a control of X-, Y- and Z-axes, and the control axes used for this purpose are referred to as an $\alpha$-axis and $\beta$-axis. The attitude of the nozzle is controlled by a zero offset type control or an offset type control.

In this three-dimensional laser machining equipment, a machining program is created by moving a nozzle on the surfaces of an actual workpiece and teaching machining points. At this time, the attitude of the nozzle is controlled so that the nozzle is perpendicular to a machining surface of the workpiece, and a predetermined distance is maintained between the nozzle and the machining surface. This is carried out to ensure that a laser beam is focused on a given position on the plane surface of the workpiece.

To achieve the above object, when the machining points are taught, the nozzle must be moved in the same direction as that in which the surface of the workpiece is machined, while maintaining the predetermined distance between the machining surface and the nozzle. Further, when the distance between the nozzle and the workpiece is adjusted, the nozzle must be moved perpendicularly with respect to the machining surface.

Nevertheless, if the plane surface of the workpiece to be subjected to a three-dimensional machining is not parallel to the X-Y plane, the attitude of the nozzle does not coincide with the axis of a basic coordinate, i.e., the nozzle is inclined. Therefore, it is very difficult to control the movement of the nozzle by using a usual operation panel by which movements in the X-, Y- and Z-axis directions are carried out in a basic coordinate system while maintaining a predetermined distance between the nozzle and the machining surface of the workpiece. Further, it is very difficult to adjust the distance between the nozzle and the machining surface by using the usual operation panel.

DISCLOSURE OF THE INVENTION

Taking the above into consideration, an object of the present invention is to provide a nozzle movement system for a laser machining equipment, by which a nozzle can be moved while maintaining a predetermined distance between the nozzle and the machining surface of a workpiece.

To attain the above object, according to the present invention, there is provided a nozzle movement system for a laser machining equipment, for moving the nozzle of a CNC laser machining equipment when carrying out a three-dimensional machining of a machining surface, the system comprising a movement-command means for outputting a movement command on a hand coordinate system composed of the axial direction of the nozzle and the plane perpendicular to the nozzle, by manually feeding the nozzle on the hand coordinate system, a matrix creation means for creating a matrix for converting the movement command to an amount of movement on a basic coordinate system based on the rotational position data of an $\alpha$-axis and $\beta$-axis for controlling the attitude of the nozzle, and a coordinate conversion means for converting the movement command to the amount of movement by using the matrix.

The movement command means provides the hand coordinate system composed of the axial direction of the nozzle and the plane perpendicular to the axis of the nozzle, and outputs the movement command on the hand coordinate system. The movement command means can be arranged as a machine control panel. The matrix creation means creates the conversion matrix from the hand coordinate system to the basic coordinate system, based on the rotational position data of the $\alpha$-axis and $\beta$-axis exhibiting the attitude of the nozzle. The coordinate conversion means converts movement commands on the hand coordinate system to amounts of movement on the basic coordinate system by using the conversion matrix, and moves the nozzle. With this arrangement, the nozzle can be easily moved without changing the distance between the nozzle and the machining surface of a workpiece, and further, the distance between the nozzle and the workpiece can be adjusted by moving the nozzle perpendicularly with respect to the machining surface.

BEST MODE OF CARRYING OUT THE INVENTION

An embodiment of the present invention will be described below with reference to the drawings.

Figure 2:
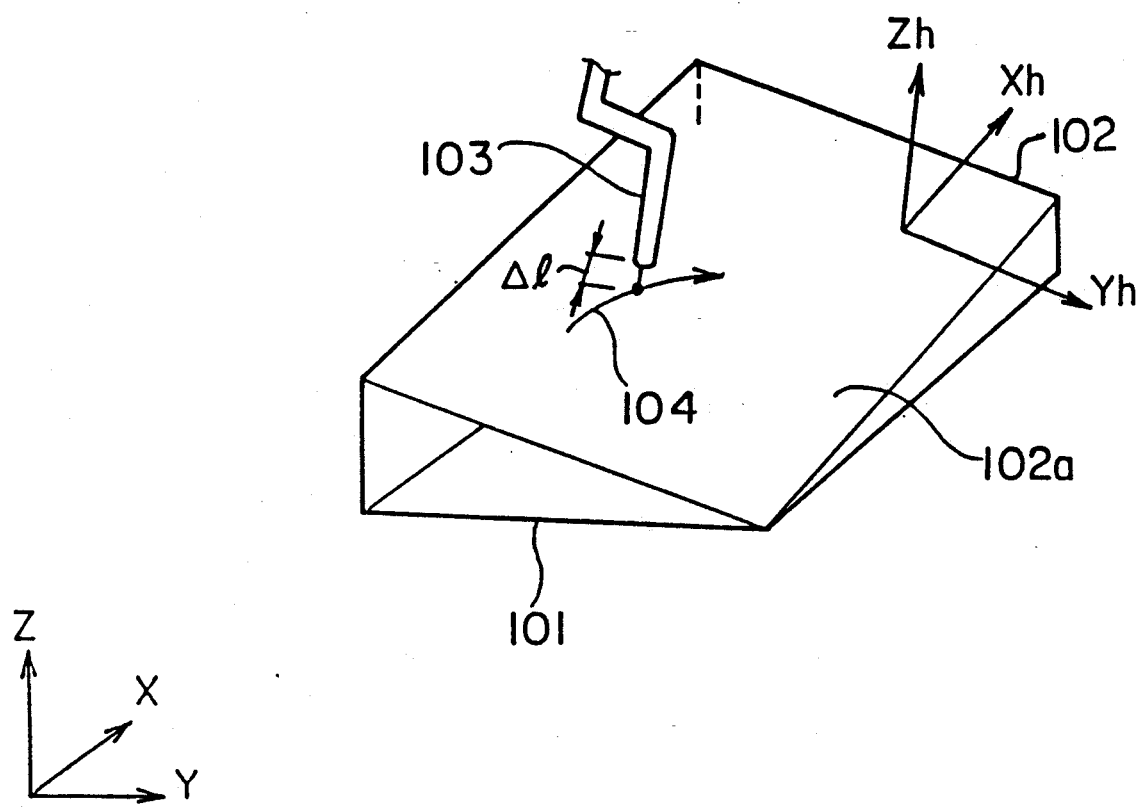
FIG. 2 is a diagram showing the relationship between a workpiece and a nozzle.

FIG. 2 shows the relationship between a workpiece and a nozzle. The machining surface 102a of a workpiece 12 is inclined with respect to the X-Y plane 101 of a basic coordinate system, and therefore, the attitude of the nozzle 103 is controlled to be made perpendicular to the machining surface 102a.

Here, the coordinate system formed by the machining surface 102a and the axis of the nozzle 103 is defined as a hand coordinate system and the coordinate axes thereof are represented by Xh, Yh and Zh, and the coordinate axes of the basic coordinate system are represented by X, Y and Z.

For example, when a machining is carried out along a locus 104 on the machining surface 102a, the nozzle 103 must be moved so that a distance Δl between the nozzle 103 and the machining surface is maintained at a predetermined amount. This is carried out to ensure that the focus of a laser beam is at a desired depth from the machining surface 102a. Therefore, when the nozzle 103 can be moved on the hand coordinate system, the nozzle 103 need only be moved on the Xh-Yh plane of the hand coordinate system. Further, when the distance Δl between the nozzle 103 and the machining surface 102a must be changed, the nozzle 103 need only be moved in the direction of the coordinate axis Zh. More specifically, according to the present invention, the movement of the nozzle 103 is controlled in such a manner that the nozzle 10 is moved on the hand coordinate system, and this movement is converted to the basic coordinate system (X, Y, Z).

Figure 3:
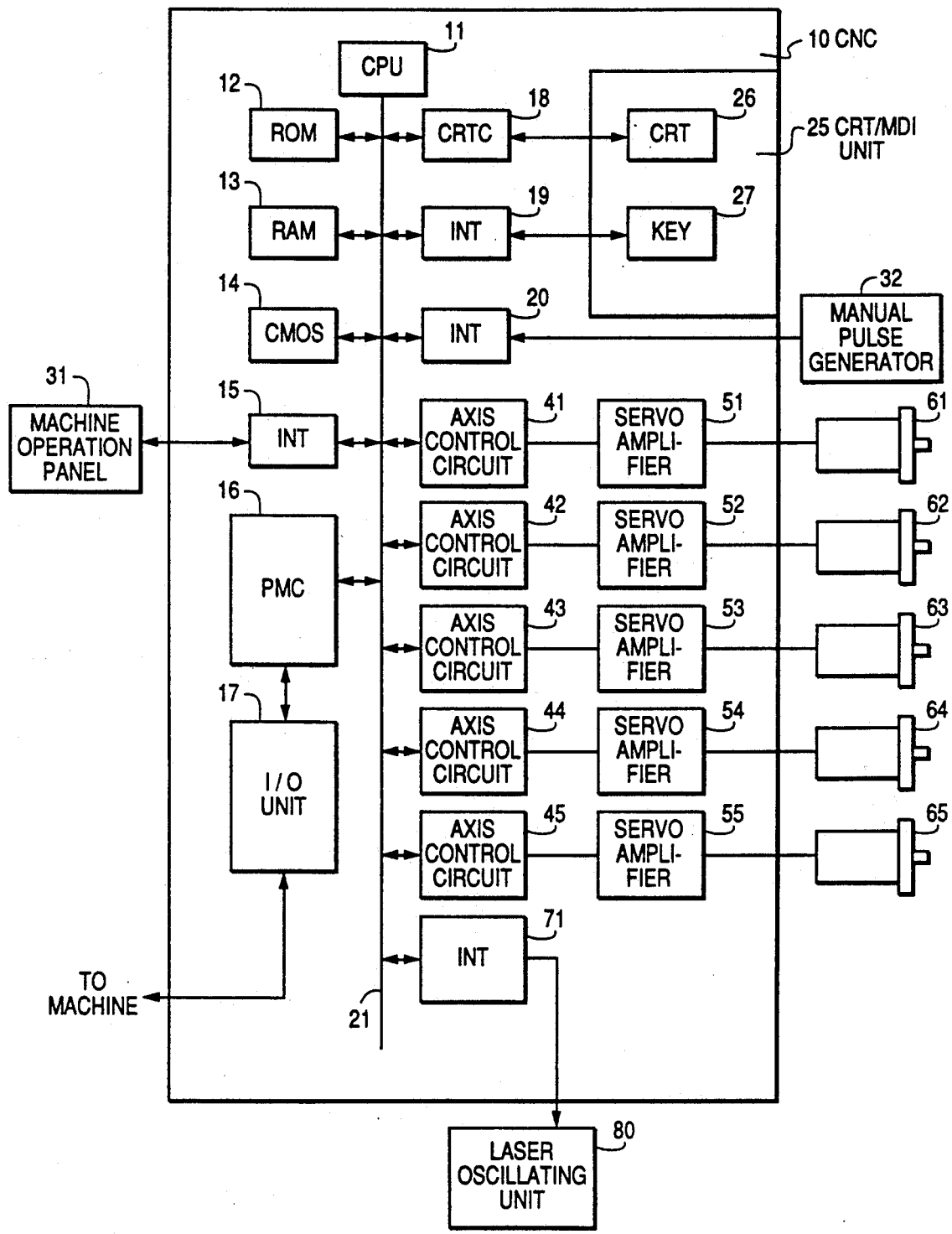
FIG. 3 is a block diagram of the hardware of a numerical control apparatus (CNC), for controlling a three-dimensional laser machining equipment.

FIG. 3 is a block diagram of the hardware of a numerical control apparatus (CNC) for controlling a three-dimensional laser machining equipment, wherein 10 designates a numerical control apparatus. A processor 11, which serves as a central component for controlling the numerical control apparatus (CNC) 10 as a whole, reads a system program stored in a ROM 12 through a bus 21 and controls the numerical control apparatus (CNC) 10 as a whole according to the system program. A RAM 13 stores temporary calculation data, display data and the like; an SRAM is used as the RAM 13. A CMOS 14 stores laser machining conditions, amounts of pitch error correction, machining programs, parameters and the like. This data is maintained as is even after a power supply to the numerical control apparatus (CNC) 10 is cut off, because the CMOS 14 is supplied with power from a battery and is a non-volatile memory.

An interface 15 is connected to a machine operation panel 13 that outputs teaching data as a moving command on the hand coordinate system. The operation of the machine operation panel 31, and the movement command, will be described later in detail.

A programmable machine controller (PMC) 16 is incorporated in the CNC 10, and control a machine in accordance with a sequence program created in a ladder form. More specifically, the programmable machine controller (PMC) 6 uses the sequence program to convert the command for an auxiliary gas and the like instructed by the machining program to a signal needed by the machine, and output same to the machining through an I/O unit 17. This output signal actuates magnets and the like, hydraulic valves, pneumatic valves, electric actuators, and the like of the machine. Further, the programmable machine controller (PMC) 16 receives signals from the limit switches and the machine operation panel of the machine, and supplies same to the processor 11 after a necessary processing of same.

A graphic control circuit 18 converts digital data such as the present position of each axis, alarms, parameters, image data and the like to image signals and outputs same. These image signals are supplied to the display unit 26 of a CRT/MDI unit 25 and displayed thereat. An interface 19 receives data from the keyboard 27 in the CRT/MDI unit 25 and supplies same to the processor 11.

An interface 20 is connected to a manual pulse generator 32 and receives pulses therefrom.

Each of the axis control circuits 41 to 45 receives a movement command for each axis from the processor 11, and outputs a command for each axis to each of the servo amplifiers 51 to 55, whereupon each of the servo amplifiers 51 to 55 receives the movement command and drives each of the servo motors 61 to 65 for the respective axes. Here, the servo motors 61 to 65 drive the X-axis, Y-axis, Z-axis, α-axis and β-axis. Each of the servo motors 61 to 65 contains a position detecting pulse coder, and position signals from the pulse coder are fed back as a pulse train. Further, this pulse train can be subjected to an F/V (frequency/speed) conversion to create a speed signal. The feedback line and speed feedback of these position signals are not shown in the Figure.

A laser oscillating unit 80 is connected to an interface 71, and a laser oscillation output, oscillation frequency, pulse duty and the like are output therethrough by the numerical control apparatus 10. The laser oscillating unit 80 outputs a laser beam in accordance with these commands, and the laser beam is introduced to the nozzle and then focused on the workpiece for machining same.

Figure 4:
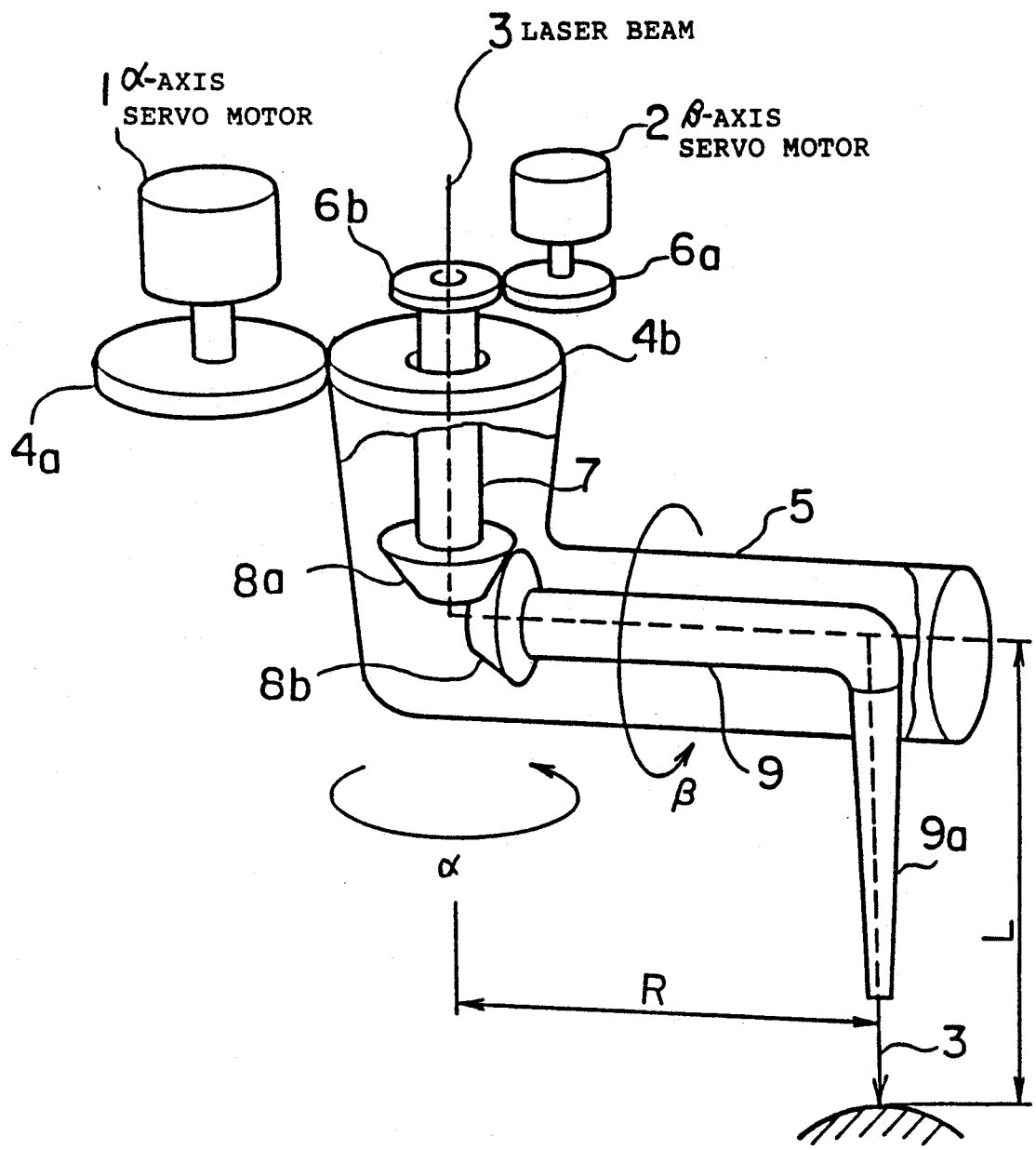
FIG. 4 is a partial diagram of an arrangement of an offset type nozzle head mechanism.

FIG. 4 is a partial arrangement diagram of an offset type nozzle head mechanism. An α-axis servo motor 1 drives the α-axis and a β-axis servo motor 2 drives the α-axis. The laser beam 3 is introduced to the extreme end of a nozzle by a not shown reflection mirror, and irradiated to the workpiece.

The α-axis is a rotation axis rotating about the Z-axis, and the rotation of the α-axis servo motor 1 causes a member 5 to be rotated of the α-axis servo motor 1 causes a member 5 to be rotated through gears 4a and 4b to thus control the rotation of the nozzle. The rotation of the β-axis servo motor 2 causes an axis 7 to be rotated through gears 6a and 6b, and the rotation of the axis 7 causes an axis 9 to be rotated and controlled through bevel gears 8a and 8b. Designated at 9a is the nozzle fixed to the axis 9.

Figure 5:
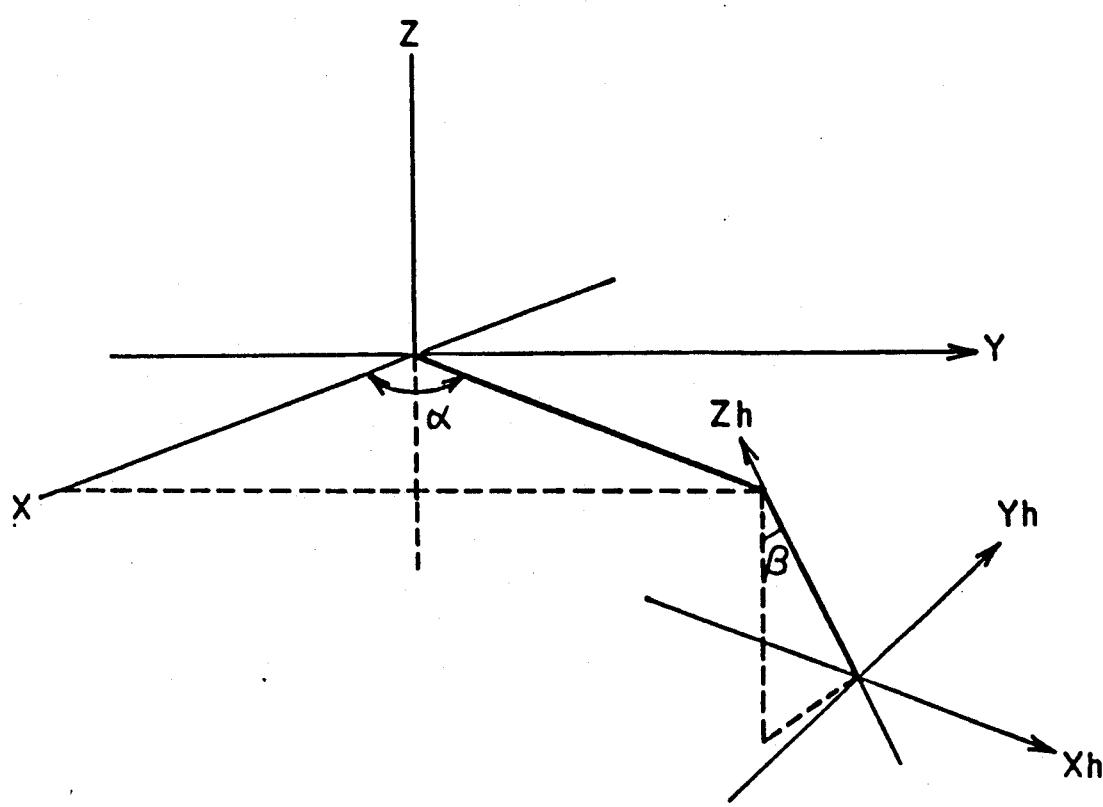
FIG. 5 is a diagram explaining a method of determining a conversion matrix for converting a hand coordinate system to a basic coordinate system.

FIG. 5 is a diagram explaining a method of determining a conversion matrix for converting the hand coordinate system to the basic coordinate system, wherein the nozzle is rotated by α° on the X-Y plane and the β-axis is assumed to be rotated by β° at tis position.

Here, when the unit vectors of the Xh-, Yh- and Zh-axes on the hand coordinate system are represented on the basic coordinate system, respectively, by u ($u_x$, $u_y$, $u_z$)

v ($v_x$, $v_y$, $v_z$)

w ($w_x$, $w_y$, $w_z$), the respective elements are represented by $u_x = \cos\alpha$ $u_y = \sin\alpha$ $u_z = 0$ $u_y = \sin\alpha$ $w_x = \sin\beta \cdot \sin\alpha$ $w_y = \sin\beta \cdot \cos\alpha$ $w_z = \cos\beta$ The unit vector v of the Yh-axis can be calculated as the outer product of the unit vector u and the unit vector w, and therefore, the following expression can be obtained.

$v_x = w_y \cdot u_z - w_z \cdot u_y$ $v_y = w_z \cdot u_x - w_x \cdot u_z$ $v_z = w_x \cdot u_y - w_y \cdot u_x$ As a result, a conversion matrix A can be represented by the following expression.

$$A = \begin{bmatrix} u_x & v_x & w_x \\ u_y & v_y & w_y \\ u_z & v_z & w_z \end{bmatrix}$$

The conversion from the hand coordinate system to the basic coordinate system can be represented by the following expression.

$[\Delta X \Delta Y \Delta Z]^T = A[\Delta xh \Delta yh \Delta zh]^T$

Figure 1:
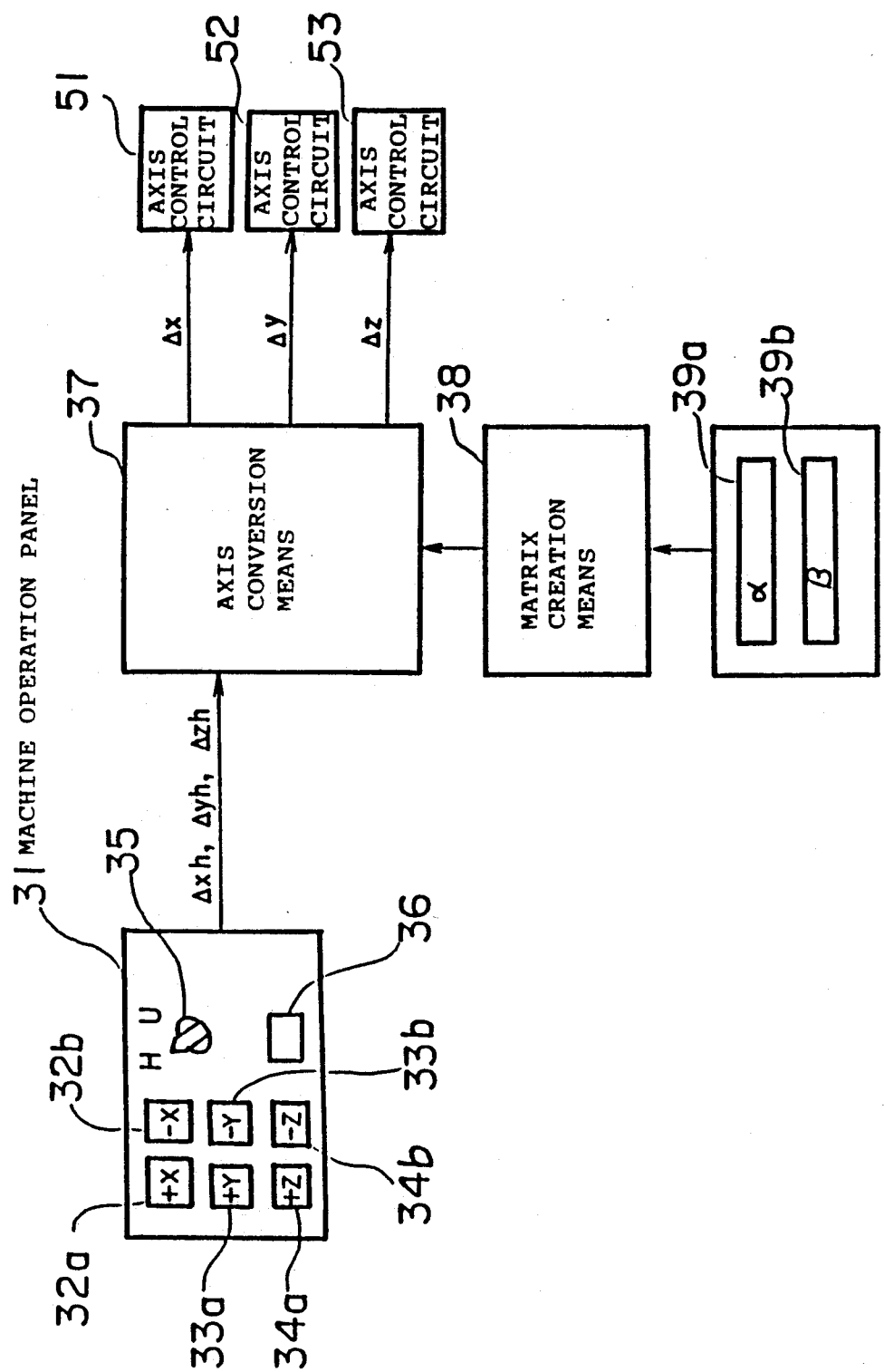
FIG. 1 is a block diagram of a process for converting a movement command on a hand coordinate system to an amount of movement on a basic coordinate system.

FIG. 1 is a block diagram of a process for converting a movement command of the hand coordinate system to an amount movement of the basic coordinate system. The machine operation panel 31 includes jog buttons 32a, 32b, 33a, 34a and 34b for moving the nozzle in each coordinate axis direction. When a switch 35 is set to the left (H), these buttons output moving commands for the hand coordinated system, and when the switch is set to the right (B) conversely, these buttons output moving commands for the basic coordinate system.

When the jog button 32a (+X) is operated, assuming that the changing switch 35 is set to the left (H), a movement command Δxh can be output by which the nozzle is moved in the Xh-axis direction on the machining surface, without changing the distance between the nozzle and the machining surface. Further, when the button 34a (+Z) is operated, a movement command Δzh can be output by which the nozzle is moved in the Zh-axis direction perpendicular to the machining surface. Here, the jog button 32a and the like are operated for moving the nozzle to the next machining point. Next, when a switch 36 is depressed, movement commands Δxh, Δyh, and Δzh on the hand coordinate axis are output by the microprocessor contained in the machine operation panel 31.

Conversely, the rotation angles of the α-axis and β-axis are stored in registers 39a and 39b and a matrix creation means 38 calculates and determines the above conversion matrix A from these rotation angles. A coordinate conversion means 37 converts the movement commands Δxh, Δyh and Δzh from the machine operation panel 31 to the amounts of movement Δx, Δy, and Δz on the basic coordinate system, by using the matrix A, and outputs same to the axis control circuits 51, 52 and 53, respectively.

As described above, the above teaching operation can be simply carried out without changing the distance between the nozzle and the machining surface in such a manner that movement commands are output on the hand coordinate system, and are converted to the amounts of movement on the basic coordinate system by the conversion matrix. Further, the nozzle can be moved in the direction perpendicular to the machining surface, and thus the distance between the nozzle and the machining surface can be easily adjusted.

Although the movement command is output from the machine operation panel in the above description, the machine operation panel can output only an operation signal for the jog button, whereas a movement command on the hand coordinate system is created and converted to an amount of movement on the basic coordinate system in the numerical control apparatus.

Further, the nozzle is described above as an offset type nozzle, but similar operation also can be carried out by a zero offset type nozzle. In this case, however, the a zero offset type conversion matrix must be prepared.

As described above, according to the present invention, since a movement command on the hand coordinate system is output from the machine operation panel and converted to a movement command on the basic coordinate system by the conversion matrix, the position of the nozzle can be simply controlled without changing the distance between the machining surface and the nozzle. Further, the distance between the nozzle and the machining surface can be easily adjusted.

Consequently, the creation of a machining program is simplified and the time necessary for creating the machining program is shortened.

I claim:

1. A nozzle movement system for a laser machining equipment for moving the nozzle of a CNC laser machining equipment carrying out a three-dimensional machining of a machining surface, comprising:
   a movement command means for outputting a movement command on a hand coordinate system composed of the axial direction of said nozzle and the plane perpendicular to said nozzle by manually feeding said nozzle on said hand coordinate system;
   a matrix creation means for creating a matrix for converting said movement command to an amount of movement on a basic coordinate system based on the rotational position data of an α-axis and β-axis for controlling the attitude of said nozzle; and
   a coordinate conversion means for converting said movement command to said amount of movement by using said matrix.

2. A nozzle movement system for a laser machining equipment according to claim 1, wherein said movement command means is composed of a machine operation panel that outputs said movement command according to an operation command from operation switches.

3. A nozzle movement system for a laser machining equipment according to claim 2, wherein said machine control panel includes a changing switch for switching between a movement command based on said basic coordinate system and a movement command on said hand coordinate system.

4. A nozzle movement system for a laser machining equipment according to claim 1, wherein said movement command means is composed of a machining control panel that outputs only a movement operation signal.

5. A nozzle movement system for a laser machining equipment according to claim 1, wherein said nozzle is an offset type nozzle.

* * * * *